US008284326B2

United States Patent
Kim et al.

(10) Patent No.: US 8,284,326 B2
(45) Date of Patent: Oct. 9, 2012

(54) METHOD AND APPARATUS FOR SCANNING CHANNEL

(75) Inventors: Joon-soo Kim, Seoul (KR); Hae-joo Jeong, Seoul (KR); Young-jin Lee, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 468 days.

(21) Appl. No.: 12/556,905

(22) Filed: Sep. 10, 2009

(65) Prior Publication Data

US 2010/0060786 A1    Mar. 11, 2010

Related U.S. Application Data

(60) Provisional application No. 61/095,677, filed on Sep. 10, 2008.

(30) Foreign Application Priority Data

Jan. 13, 2009   (KR) .................. 10-2009-0002630

(51) Int. Cl.
  H04N 5/50    (2006.01)
(52) U.S. Cl. ..................................... 348/732; 348/731
(58) Field of Classification Search .......... 348/731–733, 348/569, 570
  See application file for complete search history.

(56) References Cited

U.S. PATENT DOCUMENTS

| | | | |
|---|---|---|---|
| 7,380,263 B2 * | 5/2008 | Shintani | 725/59 |
| 2004/0036811 A1 | 2/2004 | Ikeguchi | |
| 2004/0207764 A1 * | 10/2004 | Naoi et al. | 348/732 |
| 2007/0002177 A1 | 1/2007 | Choi | |
| 2007/0236612 A1 * | 10/2007 | Onomatsu | 348/731 |

FOREIGN PATENT DOCUMENTS

| | | |
|---|---|---|
| KR | 10-0767908 B1 | 10/2007 |
| KR | 10-2008-0010181 A | 1/2008 |
| KR | 10-0867594 B1 | 11/2008 |
| KR | 10-0914808 B1 | 9/2009 |
| WO | WO 2005039166 A2 | 4/2005 |

OTHER PUBLICATIONS

International Search Report dated Mar. 22, 2010, issued in counterpart Application No. PCT/KR2009/004915.
Communication dated Oct. 4, 2011 issued by the European Patent Office in counterpart European Patent Application No. 09813210.3.

* cited by examiner

*Primary Examiner* — Michael Lee
(74) *Attorney, Agent, or Firm* — Sughrue Mion, PLLC

(57) ABSTRACT

Method and apparatus for scanning channels of a broadcast receiver are provided. The channel scanning method includes determining whether to perform an entire channel scanning operation or a partial channel scanning operation in response to a channel scan command, if the entire channel scanning operation is determined to be performed, performing the entire channel scanning operation by scanning all channels and storing channel information regarding a channel in which a broadcast signal exists in a channel map, and if the partial channel scanning operation is determined to be performed, performing the partial channel scanning operation by scanning a channel which is not registered in a pre-created channel map, and storing channel information regarding the non-registered channel in which a broadcast signals exists in the non-registered channel map.

18 Claims, 3 Drawing Sheets

METHOD AND APPARATUS FOR SCANNING CHANNEL

CROSS-REFERENCE TO RELATED APPLICATIONS

This application claims priority from U.S. Provisional Application No. 61/095,677, filed on Sep. 10, 2008 and Korean Patent Application No. 10-2009-0002630, filed on Jan. 13, 2009, the disclosures of which are incorporated herein by reference in their entirety.

BACKGROUND OF THE INVENTION

1. Field of the Invention

Apparatuses and methods consistent with the present invention relate to a broadcast receiver which performs channel scanning and a channel scanning method thereof, and more particularly, a broadcast receiver which efficiently performs channel scanning and a channel scanning method thereof.

2. Description of the Related Art

Due to the development of electronic technology, diverse broadcast services such as analog broadcast, cable broadcast, digital satellite broadcast, and digital terrestrial broadcast are supported by diverse apparatuses.

In addition, the number of broadcast channels that can be watched by users are greatly increasing in recent years. Therefore, in order for a user to easily select a channel, related-art broadcast receivers support a channel scanning function.

The channel scanning function is a function in which the broadcast receiver tunes to reception band frequencies in sequence and automatically stores information regarding a frequency channel through which broadcast signals are received.

The channel scanning function allows the user to tune the broadcast receiver to a channel by manipulating a channel up/down key without directly inputting a channel number.

However, if there is a change in the channel information, the user should scan all of the channels to find a changed channel and wait until all of the channels are scanned.

Accordingly, there is a need for a method for performing the channel scanning function more efficiently.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a broadcast receiver which efficiently performs a channel scanning function and a channel scanning method thereof.

According to an aspect of the present invention, a channel scanning method of a broadcast receiver, includes determining whether to perform an entire channel scanning operation or a partial channel scanning operation in response to a channel scan command, if the entire channel scanning operation is determined to be performed, performing the entire channel scanning operation by scanning all received physical channels and storing channel information regarding at least one physical channel in which a broadcast signal exists in a channel map, and if the partial channel scanning operation is determined to be performed, performing the partial channel scanning operation by scanning at least one physical channel which is not registered in a pre-created channel map and additionally storing channel information regarding the non-registered channel in which a broadcast signal exists in the channel map.

The determining operation may question a user about whether to perform the entire channel scanning operation or the partial channel scanning operation in response to the channel scan command.

The partial channel scanning operation may include determining whether a physical channel to be currently scanned is registered in the pre-created channel map, if the physical channel to be currently scanned is not registered in the channel map, tuning to the physical channel, determining whether a broadcast signal exists in the tuned physical channel, and if the broadcast signal exists in the tuned physical channel, additionally storing information regarding the physical channel in the channel map.

If the physical channel to be currently scanned is registered in the channel map, the partial channel scanning operation may skip tuning to the physical channel and determine whether a next channel is registered in the channel map.

If the broadcast signals does not exit in the tuned physical channel, the partial channel scanning operation may determine whether a next physical channel is registered in the channel map.

The partial channel scanning operation may detect whether a synchronization signal exists in a signal received through the non-registered channel to determine whether the broadcast signal exists in the non-registered channel.

According to an aspect of the present invention, a channel scanning apparatus of a broadcast receiver, includes a tuner which receives and demodulates a broadcast signal of a channel selected from a plurality of broadcast channels by a user, a synchronization detector which extracts a synchronization signal from a video signal of the broadcast signals, a user interface which receives a control command to control an operation of the broadcast receiver, a micro computer which determines whether to perform an entire channel scanning operation or a partial channel scanning operation when a channel scan command is received through the user interface, and, according to the determination, performs the entire channel scanning operation or the partial channel scanning operation, and a channel map storage unit which stores a channel map which is created by performing a channel scanning operation.

According to another aspect of the present invention, a channel scanning method of a broadcast receiver, including scanning all received physical channels in response to a channel scan command and storing new channel information regarding a physical channel in which a broadcast signal exists to a first storage unit, comparing the new channel information with existing channel information stored in a second storage unit, if the new channel information is different from the existing channel information, questioning a user about whether to update the existing channel information with the new channel information, and if a command to update is received from the user, changing the existing channel information to the new channel information.

According to still another aspect of the present invention, a broadcast receiver includes a channel map storage unit which stores a channel map, a user interface which receives a channel scan command, a tuner which tunes only to a channel among all tunable channels that is not registered in the channel map in sequence if a partial channel scan command is input through the user interface, and a micro computer which determines whether the channel tuned by the tuner is an effective channel through which a broadcast signal is received, and updates the channel map according to a result of the determination.

According to still another aspect of the present invention, a channel scanning method of a broadcast receiver, includes, if a partial channel scan command is input, tuning to a channel among all tunable channels that is not registered in a channel map in sequence, and determining whether the channel tuned in sequence is an effective channel and updating the channel map according to a result of the determination.

Accordingly, the channel scanning is efficiently performed.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present invention will be more apparent by describing certain exemplary embodiments with reference to the accompanying drawings, in which.

DETAILED DESCRIPTION OF EXEMPLARY EMBODIMENTS

Figure 1:
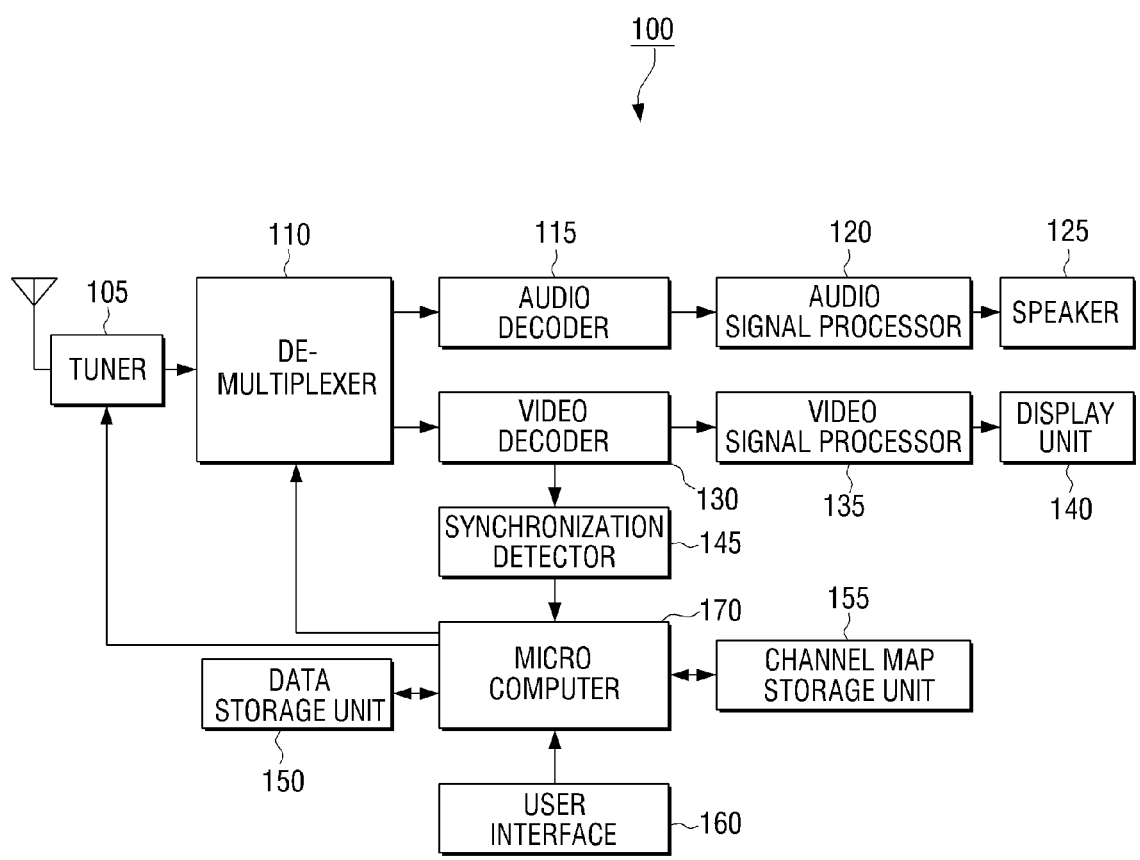
FIG. 1 is a block diagram of a broadcast receiver according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 is a block diagram of a broadcast receiver according to an exemplary embodiment.

A broadcast receiver according to an exemplary embodiment may be an apparatus that can receive broadcast signals such as terrestrial broadcast, satellite broadcast, and cable broadcast. More specifically, the broadcast receiver may be a television (TV) or a set-top box or may be realized as various terminals that can receive broadcast signals. The broadcast receiver scans effective channels, in which broadcast signals exist, in response to a channel scan command from a user, and creates a channel map using information regarding the effective channels. The channel map is used for controlling channel-related operations. That is, if the user manipulates a channel up/down key, the broadcast receiver tunes to an adjacent channel in the channel map according to the direction of manipulation and the number of manipulations, thereby receiving the broadcast signals.

The broadcast receiver according to an exemplary embodiment may perform an initial channel scanning operation with respect to all physical channels to determine whether broadcast signals exist in the channels, in response to an initial channel scan command. The broadcast receiver may determine whether to perform an entire channel scanning operation or a partial channel scanning operation in response to another channel scan command.

If it is determined that the entire channel scanning operation is to be performed, the channel scanning operation is performed with respect to all physical channels to determine whether a broadcast signal exists in each of the channels, in the same way as the initial channel scanning operation is performed.

If it is determined that the partial channel scanning operation is to be performed, the channel scanning operation is performed with respect to only a channel or channels which have not been registered in a pre-created channel map, that is, a newly added channel(s).

As described, the user of the broadcast receiver can adaptively perform the entire channel scanning operation or the partial channel scanning operation. Therefore, a time required to scan the channels can be reduced. If, however, all of the channels need to be scanned because the broadcast receiver is moved to a new location, e.g., a new house, all of the channels can be updated rather than scanning only some of channels.

As shown in FIG. 1, a broadcast receiver 100 according to an exemplary embodiment includes a tuner 105, a demultiplexer 110, an audio decoder 115, an audio signal processor 120, a speaker 125, a video decoder 130, a video signal processor 135, a display unit 140, a synchronization detector 145, a data storage unit 150, a channel map storage unit 155, a user interface 160, and a micro computer 170.

The tuner 105 receives and demodulates a broadcast signal of a channel which is selected from a plurality of broadcast channels received via a satellite reception antenna, a terrestrial reception antenna or a cable according to a tuning control signal of the micro computer 170.

The demultiplexer 110 separates an audio stream, a video stream, and system control data from the broadcast signal output from the tuner 105, and outputs them. If one or more additional data streams are included in the broadcast signal, the additional data streams may be also separated and output.

The system control data may be a program and system information protocol (PSIP). The PSIP is additional information for digital broadcast according to the Advanced Television System Committee (ATSC) standards, and provides a service such as classification of information transmitted via a corresponding transmission channel and a program guide. The PSIP may be used for creating the channel map.

The audio decoder 115 decodes the audio stream separated by and output from the demultiplexer 110, restores it to an original audio signal, and then outputs the original audio signal to the audio signal processor 120.

The audio signal processor 120 converts the audio signal decoded by the audio decoder 115 into a signal which can be output as audio through the speaker 125, which is an audio output apparatus, and outputs the signal.

The video decoder 130 decodes the video stream separated by and output from the demultiplexer 110, restores it to an original video signal, and then outputs the original video signal to the video signal processor 135.

The video signal processor 135 converts the video signal decoded by the video decoder 130 into a signal which can be output as video through the display unit 140, which is a video output apparatus, and outputs the signal.

The synchronization detector 145 extracts a synchronization signal from the video signal output from the video decoder 130 and outputs the extracted signal to the micro computer 170. The synchronization signal may be used for determining whether a broadcast signal exists in a physical channel tuned by the tuner 105.

The data storage unit 150 stores the system control data separated by the demultiplexer 110. The system control data stored in the data storage unit 150 may be used for creating the channel map which is used for controlling a channel-related operation.

The channel map storage unit 155 stores the channel map which is created through the channel scanning operation. The channel map contains information regarding effective channels in which broadcast signals exist. The information regarding each effective channel is obtained based on the virtual channel table (VCT) of the PSIP which is the system control data, and includes broadcasting station information (a source identification (ID)), a channel name, a physical channel number, and a virtual channel number.

The information regarding the effective channels which are registered in the channel map is updated with information which is newly provided when the tuning operation of the tuner 105 is performed in response to a general channel selection command. Therefore, it is not necessary to receive information regarding a change in the channels which have been previously registered through the channel scanning operation.

The user interface 160 receives a control command to control an operation of the broadcast receiver 100 from the user and outputs the control command to the micro computer 170.

The user interface 160 may be a key input unit provided on a main body of the broadcast receiver 100 or an infrared signal reception unit which receives an infrared signal transmitted from a remote controller (not shown), which is an external input apparatus, and transmits the infrared signal to the micro computer 170.

The micro computer 170 controls operations of the broadcast receiver 100 according to the user control commands input through the user interface 160.

If a channel scan command is received from the user, the micro computer 170 may display on the display unit 140 a message questioning about whether the user wishes to perform the entire channel scanning operation or the partial channel scanning operation.

If the user wishes to perform the entire channel scanning operation, the micro computer 170 controls the tuner to scan all receivable physical channels, obtains channel information regarding physical channels in which broadcast signals exist, and stores the channel information on the channel map storage unit 155. The existing channel information stored in the channel map storage unit 155 is updated with the new channel information.

On the other hand, if the user wishes to perform the partial channel scanning operation, the micro computer 170 controls the tuner 105 to tune to only channels among all receivable physical channels that are not registered in the channel map of the channel map storage unit 155.

The channel scanning method may be selected in a different way.

If a "menu check command" is input through the user interface 160 (for example, if the user presses a "Menu" button on the main body of the broadcast receiver 100 or on the remote controller), an on screen display (OSD) including a "entire channel auto scanning" menu and a "partial channel auto scanning" menu may be displayed on the display unit 140.

If the user selects the "entire channel auto scanning" menu, the micro computer 170 controls the tuner 105 to tune to the entire tunable channels in sequence. Among the broadcast channels tuned in sequence, a broadcast channel, from which a synchronization signal is detected, that is, an effective channel, is identified, and a channel map is created and stored in the channel map storage unit 155.

If the user selects the "partial channel auto scanning" menu, the micro computer 170 checks the channel map pre-stored in the channel map storage unit 155. Accordingly, the auto scanning operation is performed with respect to only the frequency channels other than the already scanned channels so that the existing channel map is updated. In this case, if there is no information stored in the channel map regarding the previously scanned channel, the auto channel scanning operation for the entire channels may be performed even if the partial channel auto scanning is selected.

If the micro computer 170 receives a signal indicating that a synchronization signal exists in a video signal received via a channel currently tuned by the tuner 105 from the synchronization detector 145, the micro computer 170 determines that a broadcast signal exists in the corresponding channel. In this case, the micro computer 170 obtains channel information using the system control data included in the broadcast signals received via the corresponding channel, and adds the obtained channel information to the channel map stored in the channel map storage unit 155.

The respective components of FIG. 1 are illustrated only for the purpose of explaining the operations of the broadcast receiver 100, and some components may be omitted and/or relationships among the components may be changed. Also, components not illustrated in FIG. 1 may be added.

For example, the broadcast receiver 100 may include a channel map storage unit 155 to store a channel map, a user interface 160 to receive a channel scan command, a tuner 105 to tune to a channel among all tunable channels that is not registered in the channel map in sequence if a partial channel scan command is input through the user interface 160, and a micro computer 170 to determine whether the channel tuned by the tuner 105 is an effective channel containing broadcast signals and update the channel map according to the result of determination.

Figure 2:
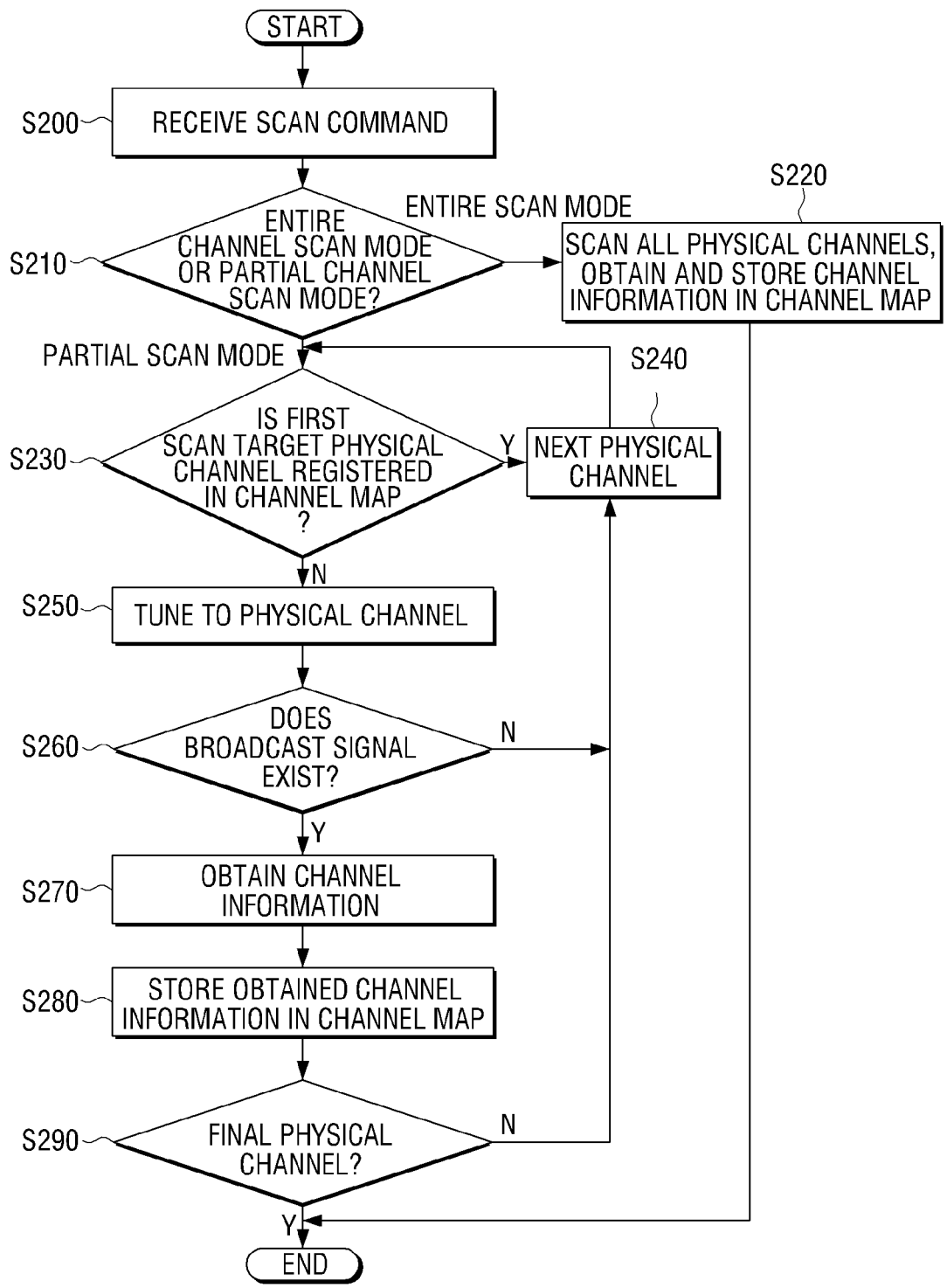
FIG. 2 is a flowchart illustrating a channel scanning method of a broadcast receiver according to an exemplary embodiment.

FIG. 2 is a flowchart illustrating a channel scanning method of the broadcast receiver according to an exemplary embodiment of the present invention.

Referring to FIG. 2, if a channel scan command is received through the user interface 160 (S200), the micro computer 170 determines whether to perform an entire channel scanning operation or a partial channel scanning operation (S210). At this time, the micro computer 170 may display on a screen a message questioning about whether the user wishes to perform an entire channel scanning operation or a partial channel scanning operation, so that the user can select one of the two channel scanning operations. Alternatively, a menu for an entire channel scanning and a menu for a partial channel scanning may be separately provided on the menu of the broadcast receiver 100 so that the user can directly select one of them. Also, an entire channel scan command key and a partial channel scanning menu key may be separately provided on the remote controller or on the main body of the broadcast receiver 100 so that the user can select one of them.

Figure 3:
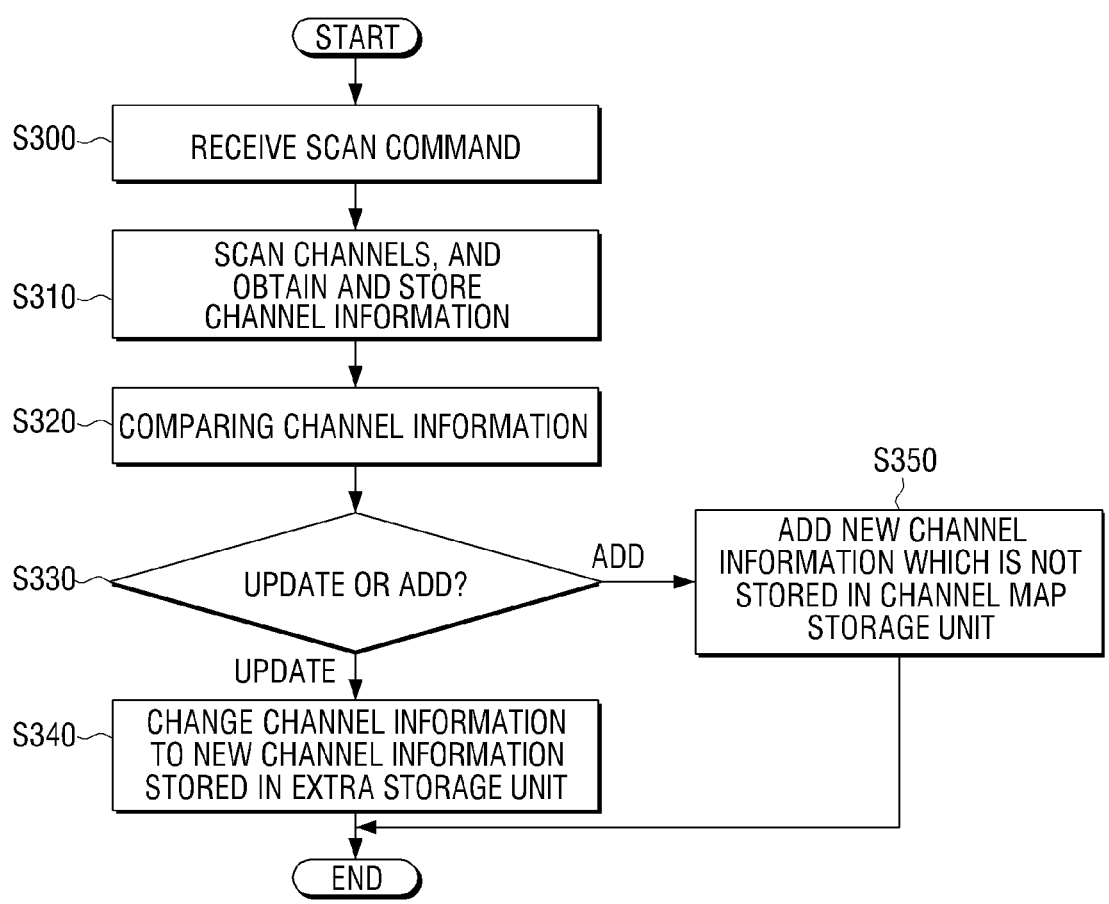
FIG. 3 is a flowchart illustrating a channel scanning method of a broadcast receiver according to another exemplary embodiment.

If it is determined that the entire channel scanning operation is selected, the micro computer 170 scans all physical channels which are receivable by the broadcast receiver 100, obtains channel information regarding physical channels in which broadcast signals exist, and stores the channel information in the channel map storage unit 155 (S220). At this time, existing channel information which is stored in the channel map storage unit 155 is updated with the new channel information. Here, the above operation S220 may be performed according to operations S310, S320, S330, S340 and S350 as illustrated in FIG. 3 as explained later.

On the other hand, if it is determined that the partial channel scanning operation is selected in operation S210, the micro computer 170 determines whether a first scan target physical channel is a channel which is registered in the channel map of the channel map storage unit 155 (S230).

This is because the partial scanning operation is performed with respect to only channels which are not registered in the channel map of the channel map storage unit 155, that is, newly added channels, rather than all receivable physical channels.

In general, in response to the channel scan command, the broadcast receiver 100 scans all receivable physical channels in sequence from the lowest order channel to the highest order channel or from the highest order channel to the lowest order channel. Therefore, a first scan target physical channel may be the lowest order physical channel or the highest order physical channel.

If it is determined that the first scan target physical channel is registered in the channel map (S230-Y), the micro computer 170 skips tuning to the physical channel, and determines whether the next physical channel is registered in the channel map to determine whether to perform the channel scanning operation for the next channel (S240).

If it is determined that the first scan target physical search is not registered in the channel map (S230-N), the micro computer 170 transmits a tuning control signal to the tuner 105 to tune to the first scan target physical channel (S250).

Next, the micro computer 170 determines whether a broadcast signal exists in the physical channel tuned by the tuner 105 (S260). More specifically, the micro computer 170 determines whether a broadcast signals exists in the physical channel tuned by the tuner 105 by determining whether a synchronization signal exists in a video signal received through the channel tuned by the tuner 105.

If it is determined that a broadcast signal does not exist in the physical channel tuned by the tuner 105 (S260-N), the micro computer 170 returns to operation S240 to determine whether to perform a scanning operation for the next physical channel.

If it is determined that a broadcast signal exists in the physical channel tuned by the tuner 105 (S260-Y), the micro computer 170 obtains channel information using system control data included in the broadcast signal received via the physical channel, and additionally stores the obtained channel information in the channel map stored in the channel map storage unit 155 (S270, S280).

Then, the micro computer 170 determines whether the currently scanned physical channel is a final physical channel to be scanned (S290).

If it is determined that the currently scanned physical channel is a final physical channel to be scanned (S290-Y), the channel scanning operation is finished. If it is determined that the scanned physical channel is not a final physical channel to be scanned (S290-N), the micro computer 170 returns to operation S240 to determine whether to perform scanning operation for the next physical channel.

In the above exemplary embodiment, although a skipping or tuning operation is determined by determining whether each channel is registered in the channel map, this should not be considered as limiting. That is, if a partial channel scan mode is determined, information regarding an existing channel map is read out so that information regarding channels among the entire channel band that are not scanned can be collectively identified. After that, the identified channels are tuned in sequence and it is determined whether the channels are effective channels, and then according to a result of determination, the channel map is updated.

According to another exemplary embodiment, the partial channel scanning is not performed with respect to the entire channels which are not registered in the channel map, and is performed with respect to only a channel which has been once registered in a previous channel map but is deleted from the channel map in the updating process, or only a channel which is never scanned and thus cannot identify whether it contains broadcast signals.

Also, if the broadcast receiver 100 can tune to various types of broadcast signals such as satellite antenna signals, terrestrial signals, and cable signals as described above, it can perform a partial channel scanning operation according to the type of broadcast signals. For example, if the entire channel scanning is selected, the broadcast receiver 100 tunes to all supportable types of broadcast signal channels in sequence, and if the partial channel scanning is selected, the broadcast receiver 100 selectively performs non-searched channel scanning, satellite antenna signal channel scanning, terrestrial signal channel scanning, or cable signal channel scanning.

FIG. 3 is a flowchart illustrating a channel scanning method of the broadcast receiver according to another exemplary embodiment.

Referring to FIG. 3, if a channel scan command is received through the user interface 160 (S300), the micro computer 170 scans all physical channels that can be accessed by the broadcast receiver 100, obtains channel information regarding physical channels in which broadcast signals exist, and stores the channel information in an extra storage unit (not shown) (S310).

After the micro computer 170 finishes scanning all physical channels in operation S310, the micro computer 170 compares existing channel information which is stored in the channel map storage unit 155 with the new channel information which is stored in the extra storage unit (S320).

If the new channel information stored in the extra storage unit is the same as the existing channel information stored in the channel map storage unit 155, the channel scanning is finished.

However, if the new channel information stored in the extra storage unit is different from the existing channel information stored in the channel map storage unit 155, the micro computer 170 displays on the display unit 140 a message questioning whether the user wishes to update the existing channel information stored in the channel map storage unit 155 with the new channel information stored in the extra storage unit (S330).

The micro computer 170 may add only the new channel information regarding a channel that does not exist in the channel information stored in the channel map storage unit 155, rather than updating the existing channel information stored in the channel map storage unit 155 with the new channel information stored in the extra storage unit. At this time, the micro computer 170 may display a screen questioning about whether the user wishes to update or add the channel information (S330).

If the user wishes to update the channel information (S330-Update), the micro computer 170 changes the existing channel information stored in the channel map storage unit 155 to the new channel information stored in the extra storage unit (S340).

If the user wishes to add the channel information in operation S330, the micro computer 170 additionally stores only the new channel information regarding the channel that does not exist in the existing channel information stored in the channel map storage unit 155, in the channel map storage unit 155 (S350).

Accordingly, the user can add the new channel information without any loss of the existing channel information.

According to the exemplary embodiments, one or more of the following advantages may be achieved.

Since the user can determine whether to perform an entire channel scanning operation or a partial channel scanning operation, the user may adaptively perform the entire channel scanning operation or the partial channel scanning operation according to the situations.

Also, the partial channel scanning operation may reduce the channel scanning time compared to the entire channel scanning operation.

Also, even if the entire channel scanning operation is performed, new channel information may be additionally stored without any loss of the existing channel information.

The present invention is not limited to the above-mentioned advantages and other advantages not mentioned above can be understood by those skilled in the art from the description of the appended claims.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A channel scanning method of a broadcast receiver, the method comprising:
    if a channel scan command is not an initial channel scanning, determining whether to perform an entire channel scanning operation or a partial channel scanning operation in response to the channel scan command;
    if it is determined that the entire channel scanning operation is to be performed, performing the entire channel scanning operation by scanning all channels and storing channel information regarding at least one channel in which a broadcast signal exists in a channel map; and
    if it is determined that the partial channel scanning operation is to be performed, performing the partial channel scanning operation by scanning at least one channel which is not registered in the channel map, and storing channel information regarding the non-registered channel in which the broadcast signal exists in the channel map.

2. The channel scanning method as claimed in claim 1, wherein the determining comprises outputting a message questioning whether to perform the entire channel scanning operation or the partial channel scanning operation in response to the channel scan command.

3. The channel scanning method as claimed in claim 1, wherein the partial channel scanning operation comprises:
    determining whether a channel to be currently scanned is registered in the channel map;
    if it is determined that the channel to be currently scanned is not registered in the channel map, tuning to the channel to be currently scanned;
    determining whether a broadcast signal exists in the tuned channel; and
    if it is determined that the broadcast signal exists in the tuned channel, storing information regarding the tuned channel in the channel map.

4. The channel scanning method as claimed in claim 3, wherein the partial channel scanning further comprises, if it is determined that the channel to be currently scanned is registered in the channel map, skipping tuning to the channel to be currently scanned, and determining whether a next channel is registered in the channel map.

5. The channel scanning method as claimed in claim 3, wherein the partial channel scanning further comprises, if it is determined that the broadcast signal does not exit in the tuned channel, determining whether a next channel is registered in the channel map.

6. The channel scanning method as claimed in claim 1, wherein the partial channel scanning operation comprises detecting whether a synchronization signal exists in the non-registered channel to determine whether the broadcast signal exists in the non-registered channel.

7. A channel scanning apparatus of a broadcast receiver, comprising:
    a tuner which receives and demodulates a broadcast signal of a channel selected from a plurality of broadcast channels;
    a user interface through which a channel scan command is input;
    a micro computer which, if the channel scan command is not an initial channel scanning, determines whether to perform an entire channel scanning operation or a partial channel scanning operation in response to the channel scan command input through the user interface, and performs the entire channel scanning operation or the partial channel scanning operation according to a result of the determination.

8. The channel scanning apparatus as claimed in claim 7, wherein the micro computer displays on a display unit a message questioning whether to perform the entire channel scanning operation or the partial channel scanning operation in response to the channel scan command.

9. The channel scanning apparatus as claimed in claim 7, further comprising a channel map storage unit that stores a channel map storing channel information,
    wherein if the channel scan command requests the partial channel scanning operation, the micro computer determines whether a channel to be currently scanned is registered in the channel map,
    wherein if it is determined that the channel to be currently scanned is not registered in the channel map, the micro computer tunes to the channel to be currently scanned, and determines whether a broadcast signal exists in the tuned channel, and
    wherein if it is determined that the broadcast signal exists in the tuned channel, the micro computer stores channel information regarding the tuned channel in the channel map.

10. The channel scanning apparatus as claimed in claim 9, wherein if it is determined that the channel to be currently scanned is registered in the channel map, the micro computer skips tuning to the channel to be currently scanned, and determines whether a next channel is registered in the channel map.

11. The channel scanning apparatus as claimed in claim 9, wherein if it is determined that the broadcast signal does not exit in the tuned channel, the micro computer determines whether a next channel is registered in the channel map.

12. The channel scanning apparatus as claimed in claim 7, further comprising a synchronization detector that extracts a synchronization signal from a video signal of the broadcast signal, wherein, if a signal, indicating that the synchronization signal exists in the video signal received through a channel currently tuned by the tuner, is received from the synchronization detector, the micro computer determines that the broadcast signal exists in the channel.

13. A channel scanning method of a broadcast receiver, the method comprising:
   scanning all channels received by the broadcast receiver in response to a channel scan command and storing new channel information regarding a channel in which a broadcast signal exists to a first storage unit;
   comparing the new channel information with existing channel information stored in a second storage unit;
   if the new channel information is different from the existing channel information, outputting a message questioning whether to update the existing channel information stored with the new channel information or not; and
   if a command to update is received in response to the message, changing the existing channel information to the new channel information.

14. The channel scanning method as claimed in claim 13, further comprising, if the new channel information is different from the existing channel information, outputting another message questioning whether to add information among the new channel information that is not stored in the second storage unit to the second storage unit.

15. The channel scanning method as claimed in claim 14, further comprising, if a command to add is received in response to the other message, adding the information among the new channel information that is not stored in the second storage unit.

16. A broadcast receiver comprising:
   a channel map storage unit which stores a channel map;
   a user interface which receives a channel scan command;
   a tuner which tunes only to a channel, among all tunable channels, that is not registered in the channel map if a channel scan command is input through the user interface; and
   a micro computer which determines whether the channel tuned by the tuner is an effective channel through which a broadcast signal is received, outputs a message questioning whether to add the channel which is determined to be an effective channel and, if a command to add the effective channel is received in response to the message, adds the effective channel on the channel map.

17. A channel scanning method of a broadcast receiver, the method comprising:
   if a channel scan command is input, tuning to a channel, among all tunable channels, that is not registered in a channel map; and
   determining whether the tuned channel is an effective channel through which a broadcast signal is received;
   outputting a massage questioning whether to add the channel which is determined to be an effective channel; and
   if a command to add the effective channel is received in response to the message, adding the effective channel on the channel map.

18. A broadcast receiver comprising:
   a tuner which tunes to a channel selected among channels that are accessible by the broadcast receiver;
   a channel scanning unit which performs a channel scanning operation scanning the channels to determine if broadcast signals exist in the channels;
   a channel map storage unit which stores channel information on the channels including the tuned channel obtained by the channel scanning operation; and
   a micro computer which controls the channel scanning unit to scan the channels, outputs a message questioning whether to update a channel in which it is determined that broadcast signals exist, and if a command to update the channel is received in response to the message, updates the channel information.

* * * * *